Figure 4:
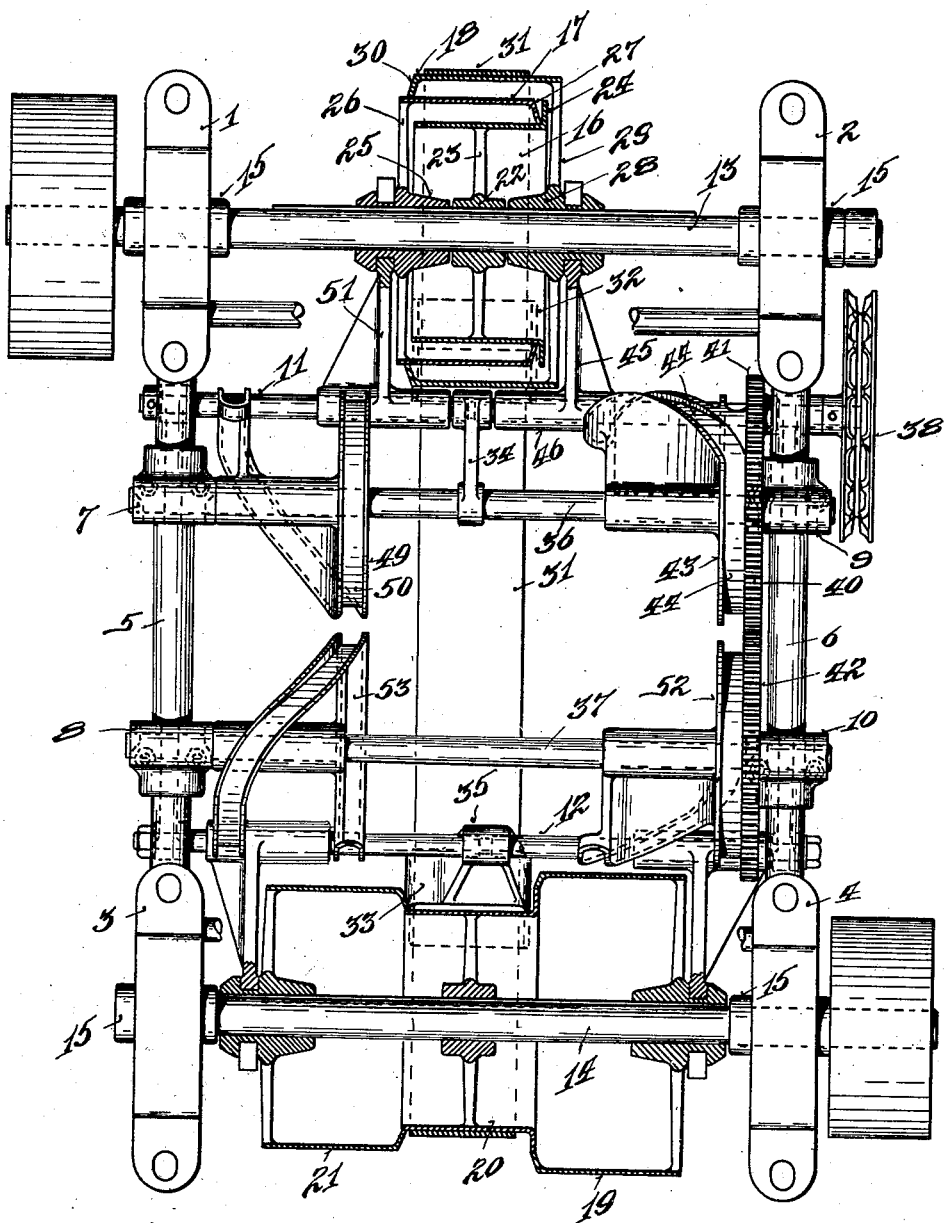

No. 890,334. PATENTED JUNE 9, 1908.
N. D. CHARD & M. SHIPLEY.
VARIABLE SPEED MECHANISM.
APPLICATION FILED JUNE 24, 1907.
2 SHEETS—SHEET 1.
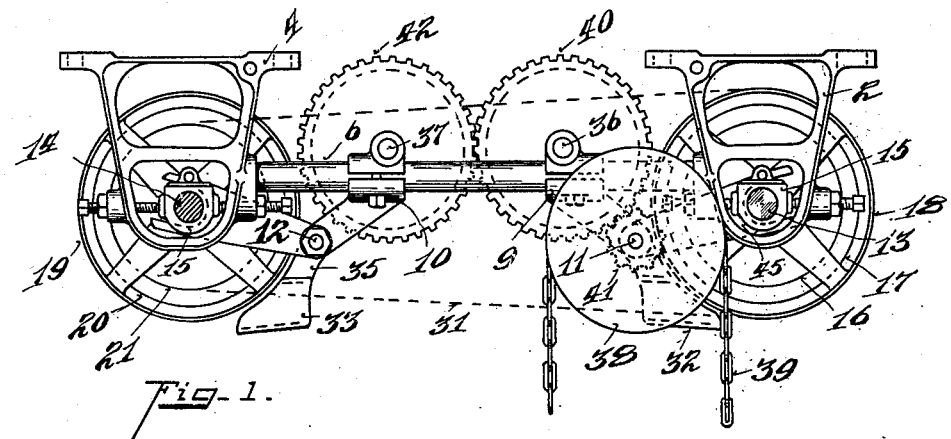

No. 890,334. PATENTED JUNE 9, 1908.
N. D. CHARD & M. SHIPLEY.
VARIABLE SPEED MECHANISM.
APPLICATION FILED JUNE 24, 1907.

2 SHEETS—SHEET 2.

UNITED STATES PATENT OFFICE.

NICHOLAS D. CHARD AND MURRAY SHIPLEY, OF CINCINNATI, OHIO, ASSIGNORS TO THE LODGE & SHIPLEY MACHINE TOOL COMPANY, OF CINCINNATI, OHIO, A CORPORATION.

VARIABLE-SPEED MECHANISM.

No. 890,334.  Specification of Letters Patent.  Patented June 9, 1908.

Application filed June 24, 1907. Serial No. 380,618.

*To all whom it may concern:*

Be it known that we, NICHOLAS D. CHARD and MURRAY SHIPLEY, citizens of the United States, residing at Cincinnati, in the county of Hamilton and State of Ohio, have invented certain new and useful Improvements in Variable-Speed Mechanism, of which the following is a specification.

The invention relates to a speed variator primarily adapted to be incorporated in a counter shaft, but applicable to any of the various uses to which such mechanisms are directed.

One of the objects of the invention is to preserve all of the advantages of a variable speed device typified by the well-known arrangement in which a belt is laterally shifted from one step to the other of the pulley wheels of opposing cones, but avoiding all the disadvantages resulting from the necessity of laterally shifting the belt.

Another object of the invention is to provide means for laterally shifting the belt wheels themselves either of the driving or driven shaft, or both, into and out of telescopic relation with one another, whereby the belt is always maintained in the same plane.

Another object of the invention is to provide means for simultaneously shifting an opposing coöperating pair of belt wheels simultaneously, where the shifting members are employed on both the driving and driven shafts.

Another object of the invention is to provide means for shifting the belt wheels, whereby the variations of speeds are necessarily effected in a gradually increasing or decreasing ratio, thereby avoiding any possibility of an abrupt change from a high speed to a low speed, or vice versa, which strains the device.

Another object of the invention is to get a simple and compact mechanism which will give all the changes necessary and the correct ratio of changes desirable with a speed changing driver for various kinds of machines.

Other various objects and advantages of the mechanism will appear in connection with the description of the features of the invention disclosed in the accompanying drawings, making a part of this specification, in which:—

Figure 1 is a side elevation of the countershaft. Fig. 2 is a detailed side view, partly in section, showing one of the pulley shifting elements. Fig. 3 is a front elevation of one of the shifting cams. Fig. 4 is a top plan view of the entire countershaft, partly in section.

The frame for supporting the countershafts consists in the main hangers 1, 2, 3, 4, attached to the ceiling. The hangers 1 and 3, and 2 and 4 are connected respectively by means of the connecting rods 5, 6. On the rod 5 are the hanging clamp brackets 7, 8, and a similar pair of brackets 9, 10, are clamped upon the rod 6. In the lower ends of the brackets 7 and 9 is journaled an actuating shaft 11. In the lower ends of the brackets 8 and 10 is fixed a connecting rod 12. From this it will be seen that the pieces 5, 6, shaft 11, and rod 12, form a substantially rectangular frame.

13, 14, represent the countershafts journaled in suitable boxes 15 in the hangers 1, 2, 3, 4.

The speed changing elements consist specifically of the pulley wheels 16, 17, and 18 on shaft 13, and 19, 20, and 21 on shaft 14.

The pulley wheel 16 has a hub 22 and middle spoke arms or web 23, and on one side of the pulley is formed a peripheral flange 24, the hub 22 being fixed to shaft 13. The next larger diameter pulley wheel 17 has a hub 25 with the arms 26 at one side of the pulley, the face of the pulley being provided with a downwardly tapering peripheral flange 27, which lies adjacent to the peripheral flange 24 of the pulley 16, when the pulleys are in telescopic relation. On the other side of pulley 16 the largest diameter pulley wheel 18 is provided with the hub 28, having the side arm 29, and the face of the pulley being provided with a downwardly tapering peripheral flange 30. The hubs 25 and 28 are keyed to the shaft 13.

The three pulley wheels on the shaft 14 are substantially duplicates in construction as those just described on shaft 13.

On shaft 13 the pulley wheels are shown in their nested or telescopic relation, while on shaft 14 they are shown completely out of telescopic relation.

It will be seen that in the telescopic relation of the pulleys the inner periphery of each larger diameter pulley wheel fits over the outer periphery of its next smaller diameter pulley wheel.

31 represents the belt passing over the opposing pulleys. It is held constantly in the plane of the central pulleys 16 and 20 by means of the belt guides 32, 33. These belt guides are held by the supporting arms 34, 35. In the clamp brackets 7, 9, is journaled a shaft 36 and in the clamp brackets 8, 10, is journaled shaft 37. On the shaft 11 is a sprocket or chain wheel 38, around which the chain 39 passes to the floor, where it passes over any suitable windlass, or may be suspended as desired. On the shaft 11 is fixed a pinion 41 meshing with a gear wheel 40 on shaft 36, which in turn meshes with gear wheel 42 on shaft 37.

Fixed to the inner face of the gear wheel 40 is a cam wheel 43, having a peripheral cam groove 44. 45 represents a yoke arm, the yoke of which engages the peripheral grooved hub 28 of pulley wheel 18. The inner end of said arm 45 has a sleeve 46 sliding on the shaft 11. Said sleeve has a boss 47 on the end of which is a roller 48 which rides in the groove 44 of the wheel 43, as shown in detail Fig. 2. On the other end of shaft 11 is fixed a similar cam wheel 49, having a peripheral cam-way 50 which engages with the yoke lever 51 connected with the pulley wheel 17 in like manner as yoke arm 45. On the shaft 37 is a similar third cam wheel 52 connected up with the gear wheel 19, and a fourth cam wheel 53 in like manner connected up with the sliding pulley wheel 21.

These are the elements of the structure, and their operation is as follows:—In the position shown in Fig. 4 the pulley wheels on shaft 13 are in telescopic relation and the pulley wheels on shaft 14 are in non-telescopic relation, the belt connecting the small diameter pulley wheel 20 with the large diamter pulley wheel 18. If now the chain 39 be rotated in the proper direction, the cam wheel 43 will be rotated serving to shift the pulley wheel 18 to the right, throwing it out of telescopic relation, and at the same time cam wheel 53 will be rotated to shift the gear wheel 21 to the right, telescoping it over the gear wheel 20. The beveled edges of the pulleys entering wedge-like into the belt, will cause the belt to ride up on the face of the pulley, so that the drive will be between gear wheels 17 and 21. If the chain 39 be given another turn in the same direction, the pulley wheel 17 will be shifted to the left, through cam wheel 49, and the pulley wheel 19 will through the cam wheel 52 be telescoped over the pulley wheel 21. If the chain is then rotated in the opposite direction, the process will be reversed, so that the speed ratio may be thus increased and decreased, which obviates any shock or jar on the mechanism.

It will be noted that the cam grooves formed in the periphery of the cam wheel have a straight and an angular conformation. This is for the purpose of giving an idle movement to the cam wheel relative to its particular yoke arm, in order to enable the shifting of one set of pulleys into operation while the other set of pulleys remain at rest. The smallest of the pulley wheels is, of course, fixed to its shaft, but the larger, or telescoping pulleys, are fixed to turn with and slide on their supporting shaft. This means for simultaneously telescoping one set of pulleys and untelescoping the opposite set of pulleys, avoids any necessity for a belt tightener or other belt compensating mechanism, as the belt is always automatically fitted to opposing pulleys which take up the length of the belt.

This device is absolutely noiseless, compact and simple. The proper speed ratios are obtained by a serial action or shifting of the pulleys in relative opposing sets on their respective shafts in progressive or decreasing ratios, step by step, so that there are no abrupt jumps from a high to a low speed. Again, the use of a single controlling instrumentality for effecting these changes is a very great mechanical convenience.

Having described our invention, we claim:—

1. In a variable speed device, two shafts, telescoping pulleys adapted to turn with and slide on each shaft, a belt, means for holding the belt in a constant plane, and means for simultaneously shifting the individual members of said opposing sets of pulleys into and out of telescopic relation, substantially as described.

2. In a variable speed device, two shafts, telescoping pulleys on each shaft, means for simultaneously telescoping the pulleys on one shaft and untelescoping the pulleys on the other shaft, a belt, and means for holding it in a constant plane relative to the shifting pulleys, substantially as described.

3. In a variable speed device, two shafts, telescoping pulleys adapted to turn with and slide on said shafts, a belt, means for holding the same in a constant plane, and means for simultaneously shifting the opposing pulleys substantially as described.

4. In a variable speed device, two shafts, fixed pulleys and larger diameter telescoping pulleys, adapted to turn with and slide on each shaft, a belt, means for holding the belt in a constant plane, an actuating shaft, connections between said shaft and the individual pulley members, and means for rotating said shaft, whereby the pulleys in relatively opposing sets are telescoped and untelescoped simultaneously into serial operative connection with the belt to produce gradually increasing and decreasing ratios of speed, substantially as described.

5. In a variable speed device, two shafts, fixed pulleys and larger telescoping pulleys, adapted to turn therewith and slide thereon, and means adapted to telescope the pulleys on one shaft while untelescoping the pulleys on the other shaft, substantially as described.

6. In a variable speed device, two shafts, small fixed pulleys and larger telescoping pulleys on each shaft, adapted to turn therewith and slide thereon, a belt, the smaller pulleys on each shaft being oppositely placed, means for maintaining the belt constantly in the plane of said opposite small pulleys, a cam wheel for each shifting pulley, having connections therewith adapted to laterally slide said pulleys in opposite directions, and means for operating the said cam wheels for shifting said pulley wheels into and out of telescopic relation, substantially as described.

7. In a device of the class described, a driving and a driven shaft, a series of wheels of different diameter on each shaft, the smaller one of which is fixed, the others being adapted to turn therewith and slide thereon, an endless transmitter adapted to connect any selected pair of wheels on said shafts, and means for shifting said wheels laterally into and out of telescopic relation with one another, whereby the endless transmitter may be successively engaged and disengaged with selected opposing pairs of driving and driven wheels while maintained in an invariable plane, substantially as described.

8. In a variable speed device, a shaft, a pulley, a telescoping pulley, adapted to turn with and slide on said pulley, a cam wheel having connections with the slidable pulley, adapted to shift the same into and out of telescopic relation with the smaller pulley, and means for rotating said cam wheel, substantially as described.

9. In a variable speed device, two shafts, a small pulley fixed to each shaft and oppositely disposed, a belt held normally in the plane of said pulleys, larger telescopic pulleys, adapted to turn with and slide on said shafts, and means for shifting said slidable pulleys into and out of telescopic relation with the said fixed pulleys, substantially as described.

10. In a variable speed device, two shafts, oppositely disposed small pulleys fixed on said shafts, a belt held normally in the plane of said pulleys, adapted to turn with and slide on said shafts into and out of telescopic relation with said fixed pulleys respectively, one set of pulleys being telescoped when the other is untelescoped, and means for simultaneously shifting one pulley into and the other out of telescopic relation on said shafts, substantially as described.

11. In a variable speed device, two shafts, oppositely disposed small pulleys fixed to said shafts, a belt held in the plane of said pulleys, two larger different diameter pulley wheels on each shaft, placed upon opposite sides of said small pulleys, and adapted to turn with and slide on said shafts into and out of telescopic relation with said small pulleys and with one another respectively, and means for shifting said slidable pulleys to and from engagement with the belt, substantially as described.

12. In a variable speed device, two shafts oppositely disposed small pulleys fixed to said shaft, a belt held normally in the plane of said pulleys, two larger different diameter pulley wheels on each shaft placed upon opposite sides of said small pulleys, and adapted to turn with and slide on said shaft into and out of telescopic relation with said small pulleys and with one another respectively, and means for simultaneously shifting the slidable pulleys on said two shafts in sets serially into and out of telescopic relation, and into and out of driving engagement with the belt, substantially as described.

13. In a variable speed device, two shafts, oppositely disposed small pulleys fixed to said shaft, a belt held normally in the plane of said pulleys, two larger different diameter pulley wheels on each shaft placed upon opposite sides of said small pulleys, and adapted to turn with and slide on said shaft into and out of telescopic relation with said small pulleys and with one another respectively, a cam wheel for each slidable pulley having independent connection therewith, and means for simultaneously imparting rotation to the said cam wheels, whereby the slidable pulleys are shifted in sets serially into and out of telescopic relation simultaneously on said two shafts and into and out of driving engagement with the belt, substantially as described.

14. In a variable speed device, two shafts, oppositely disposed small pulleys fixed to said shaft, a belt held normally in the plane of said pulleys, two larger different diameter pulley wheels on each shaft placed upon opposite sides of said small pulleys, and adapted to turn with and slide on said shaft into and out of telescopic relation with said small pulleys and with one another respectively, a cam wheel for each slidable pulley having independent connection therewith, means for simultaneously imparting rotation to the said cam wheels, whereby the slidable pulleys are shifted in sets serially into and out of telescopic relation simultaneously on said two shafts and into and out of driving engagement with the belt, each cam wheel being provided with a straight and an inclined peripheral cam groove, whereby each cam wheel is given an idle movement, substantially as described.

In testimony whereof, we have hereunto set our hands.

NICHOLAS D. CHARD.
MURRAY SHIPLEY.

Witnesses:
OLIVER B. KAISER,
LEO O'DONNELL.